Patented Oct. 30, 1934

1,978,763

UNITED STATES PATENT OFFICE 1,978,763

WATER-INSOLUBLE AZO DYES

Gustav Reddelien, Leipzig, Heinrich Ohlendorf, Dessau in Anhalt, and Karl Holzach, Ludwigshafen-on-the-Rhine, Germany, assignors to General Aniline Works, Inc., New York, N. Y., a corporation of Delaware No Drawing. Application June 27, 1933, Serial No. 677,955. In Germany July 8, 1932

15 Claims. (Cl. 260—97)

This invention relates to the manufacture of dyes which dye cellulose esters, particularly acetate silk, very fast and deep tints from red to pure blue and having particular advantages in the white discharge method. The invention consists in diazotizing 6-bromo (or -chloro)-2,4-dinitro-1-aminobenzene and coupling the product with a benzene or naphthalene derivative capable of coupling, which has the general formula

(wherein X is any desired benzene or napthalene nucleus which may contain one or more substituents, such as halogen, alkyl, alkoxy, hydroxy, $NO_2$, and R and $R_1$ represent hydrogen, alkyl or hydroxyethyl).

In German specifications Nos. 479,343 and 447,420 are disclosed azo dyes containing hydroxyethylamino groups and suitable for dyeing acetate silk. The tints obtainable by the mode of working published in the said specifications are only up to red violet. The production of azo dyes which yield deeper violet tints, and particularly blue tints, and at the same time have a particularly desirable effect in the white discharge method, must be accounted a considerable technical advance.

The new azo dyes which are insoluble in water, are applied for dyeing artificial silk, such as acetate silk, in the manner usual for such dyes, namely in aqueous suspension with or without the addition of a colloid or solvent.

The dyeings obtained by use of the new dyes have a good, and in part very good, fastness to light, acids, washing, water and perspiration.

The following examples illustrate the invention, the parts being by weight:—

*Example 1.*—29 parts of 6-bromo-2,4-dinitro-1-aminobenzene are introduced into 100 parts of concentrated sulfuric acid at 40 to 50° C. There is added, while stirring, at about 60° C., a nitrosyl sulfuric acid which has been prepared by introducing 6.9 parts of sodium nitrite into 70 parts of concentrated sulfuric acid in known manner. After some time, the whole is cooled to about 25° C. and then poured upon broken ice and intimately stirred therewith; after this dilution, the mass is 10 to 15 times its original weight. The diazo solution thus obtained and, if necessary, filtered, is run, with vigorous stirring, into an ice-cold solution of 14.3 parts of 1-aminonaphthalene in 500 parts of water and 14 parts of hydrochloric acid of 23° Bé. Coupling sets in forthwith and is finished in a short time. The dye is filtered, washed until neutral and dried. It forms blue crystals of a bronze luster which dissolve in organic solvents to a reddish blue solution. It may be dispersed in the usual manner and applied for dyeing acetate silk fast blue tints according to the methods usual in the case of suspended dyes, for example in soap suspension baths.

*Example 2.*—In the manner described in Example 1, there is prepared a diazo solution from 29 parts of 6-bromo-2,4-dinitro-1-aminobenzene and the solution is run into an ice-cold solution of 14.9 parts of diethylaminobenzene in 500 parts of water and 11 parts of hydrochloric acid of 23° Bé. For hastening the coupling, the mixture may be neutralized with some sodium acetate. The dye is then filtered with suction and brought into paste form or dried with or without the addition of a dispersing agent, a protective colloid or the like. Acetate silk is dyed reddish violet by the dye.

*Example 3.*—A diazo solution is prepared by stirring, at 50 to 60° C., 29 parts of 6-bromo-2,4-dinitro-1-aminobenzene into a nitrosyl sulfuric acid made by introducing 6.9 parts of sodium nitrite into 120 parts of concentrated sulfuric acid and highly diluting the mass by pouring it on to ice. The filtered sulfuric acid diazo solution is run into a cold solution of 18.1 parts of di(hydroxyethyl)-aminobenzene in 500 parts of water and 11 parts of hydrochloric acid of 23° Bé. The mixture is neutralized with so much sodium acetate that the coupling is complete in the course of some hours. The dye is worked up as usual. It dyes acetate silk blue red fast to light.

If there is used for the coupling a solution of 19.5 parts of 1-methyl-3-di(hydroxyethyl)-aminobenzene, there is obtained a dye which dyes acetate silk reddish dark violet tints.

The dye obtained in analogous manner by means of 1-chloro-3-di(hydroxyethyl)-aminobenzene produces on acetate silk a bluish Bordeaux of very good properties of fastness.

1-nitro-3-di(hydroxyethyl)-aminobenzene yields a dye dyeing somewhat more yellow tints and 1-di(hydroxyethyl)-amino-5-hydroxynaphthalene a dye which produces blue-green tints.

*Example 4.*—The diazo solution from 29 parts of 6-bromo-2,4-dinitro-1-aminobenzene is allowed to run into a solution feebly acid with mineral acid of 22.5 parts of 1-methyl-4-methoxy-3-di(hydroxyethyl)-aminobenzene and so much sodium acetate is added that the coupling occurs in acetic acid. The dry dye dissolves in organic solvents to blue solutions. On acetate silk it yields very fast reddish-blue tints.

*Example 5.*—A diazo solution from 29 parts of 6-bromo-2,4-dinitro-1-aminobenzene is coupled with a solution of 18.7 parts of 1-monohydroxyethylaminonaphthalene. The dye produced dyes acetate silk pure blue.

*Example 6.*—24 parts of 6-chloro-2,4-dinitro-1-aminobenzene are diazotized, for example, by stirring them at a temperature of about 55° C. into a nitrosyl sulfuric acid prepared from 6.9 parts of sodium nitrite and 120 parts of concentrated sulfuric acid. By introducing this diazotized product into many times its weight of water, there is obtained a diazo solution which is easily coupled; after filtering this solution, it is allowed to run into a solution, feebly acid with mineral acid, of 20.7 parts of 1-methyl-3-hydroxyethyl-butylaminobenzene. The coupling comes rapidly to an end, even without the addition of an agent that binds acid. The finished dye produces on acetate silk a blue-violet of excellent fastness to light.

If there is used for the coupling a solution of 24.1 parts of 1,4-dimethoxy-6-di(hydroxyethyl)-aminobenzene, there is obtained a dye which dyes acetate silk full marine blue.

*Example 7.*—A diazo solution from 29 parts of 6-bromo-2,4-dinitro-1-aminobenzene is coupled in the manner described with a solution of 23.7 parts of 1-methyl-4-methoxy-3-butylhydroxyethylaminobenzene. The dye produced dyes acetate silk pure blue.

It is obvious that our invention is not limited by the foregoing examples or by the specific details given therein and other azo components of the general formula, given above, may likewise be used and yield dyes of similar properties.

What we claim is:—

1. The dyes corresponding to the general formula

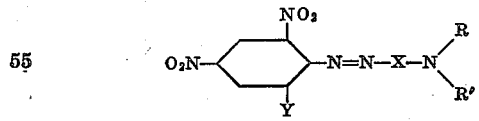

wherein Y means Br or Cl, X is a radicle of the benzene or naphthalene series which may be substituted by halogen, alkyl, alkoxy, hydroxy or $NO_2$ and R and R' represent hydrogen, alkyl or hydroxyethyl, said dyes being insoluble in water and dyeing from an aqueous suspension cellulose esters fast and deep tints from red to pure blue, the dyeings being white dischargeable.

2. The dyes corresponding to the general formula

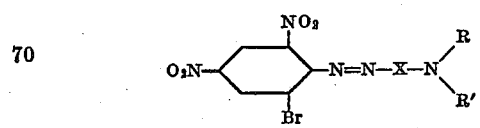

wherein X is a radicle of the benzene or naphthalene series which may be substituted by halogen, alkyl, alkoxy, hydroxy or $NO_2$ and R and R' represent hydrogen, alkyl or hydroxyethyl, said dyes being insoluble in water and dyeing from an aqueous suspension cellulose esters fast and deep tints from red to pure blue, the dyeings being white dischargeable.

3. The dyes corresponding to the general formula

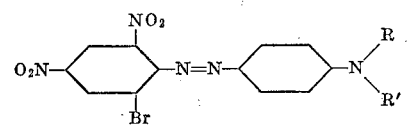

in which the benzene nucleus bearing the amino group may be substituted by alkyl, halogen, alkoxy or $NO_2$ and in which R and R' represent hydrogen, alkyl or hydroxyethyl, said dyes being insoluble in water and dyeing from an aqueous suspension cellulose esters fast and deep tints from violet to pure blue, the dyeings being white dischargeable.

4. The dyes corresponding to the general formula

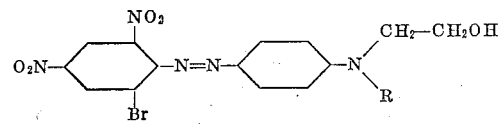

in which the benzene nucleus bearing the amino group may be substituted by alkyl, halogen, alkoxy or $NO_2$ and in which R represents hydrogen, alkyl or hydroxyethyl, said dyes being insoluble in water and dyeing from an aqueous suspension cellulose esters fast and deep tints from violet to pure blue, the dyeings being white dischargeable.

5. The dyes corresponding to the general formula

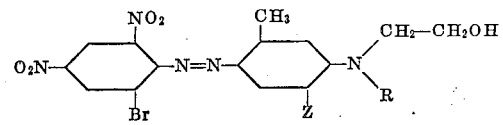

wherein Z means hydrogen or an alkoxy group and R represents hydrogen, alkyl or hydroxyethyl, said dyes being insoluble in water and dyeing from an aqueous suspension cellulose esters fast and deep tints from violet to pure blue, the dyeings being white dischargeable.

6. The dye which corresponds to the formula

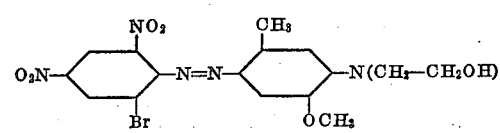

said dye being insoluble in water and dyeing from an aqueous suspension cellulose esters very fast reddish-blue tints.

7. The dye which corresponds to the formula

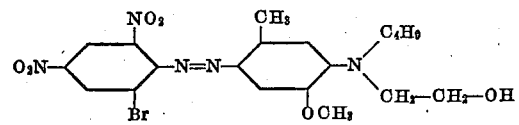

said dye being insoluble in water and dyeing from an aqueous suspension cellulose acetate clear blue tints.

8. The dye which corresponds to the formula

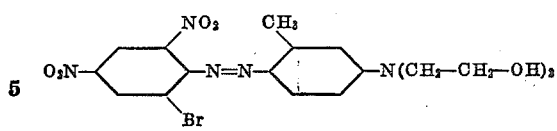

said dye being insoluble in water and dyeing from an aqeous suspension cellulose acetate reddish dark violet tints.

9. The process which comprises diazotizing a compound of the general formula

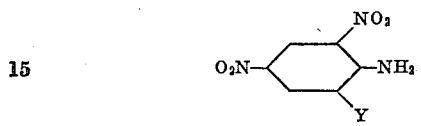

wherein Y is chlorine or bromine, and coupling the diazo compound with an azo component of the general formula

wherein X means a benzene or naphthalene radicle which may be substituted by halogen, alkyl, alkoxy, hydroxy or $NO_2$ and R and R' represent hydrogen, alkyl or hydroxyalkyl.

10. The process which comprises diazotizing 6-bromo-2,4-dinitro-1-aminobenzene and coupling the diazo compound with an aniline derivative of the general formula

which may be substituted by halogen, alkyl, alkoxy, hydroxy or $NO_2$ and wherein R and R' represent hydrogen, alkyl or hydroxyalkyl.

11. The process which comprises diazotizing 6-bromo-2,4-dinitro-1-aminobenzene and coupling the diazo compound with an aniline derivative of the general formula

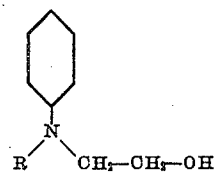

which may be substituted by halogen, alkyl, alkoxy, hydroxy or $NO_2$ and wherein R represents hydrogen, alkyl or hydroxyalkyl.

12. The process which comprises diazotizing 6-bromo-2,4-dinitro-1-aminobenzene and coupling the diazo compound with an aniline derivative of the general formula

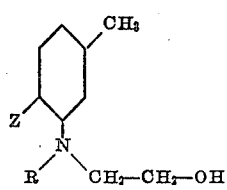

wherein Z means hydrogen or an alkoxy group and R represents hydrogen, alkyl or hydroxyethyl.

13. The process which comprises diazotizing 6-bromo-2,4-dinitro-1-aminobenzene and coupling the diazo compound with 1-methyl-4-methoxy-3-di(hydroxyethyl)-aminobenzene.

14. The process which comprises diazotizing 6-bromo-2,4-dinitro-1-aminobenzene and coupling the diazo compound with 1-methyl-4-methoxy-3-butylhydroxyethylaminobenzene.

15. The process which comprises diazotizing 6-bromo-2,4-dinitro-1-aminobenzene and coupling the diazo compound with 1-methyl-3-di(hydroxyethyl)-aminobenzene.

GUSTAV REDDELIEN.
HEINRICH OHLENDORF.
KARL HOLZACH.